United States Patent [19]
Inagaki et al.

[11] Patent Number: 5,170,308
[45] Date of Patent: Dec. 8, 1992

[54] METHOD AND SYSTEM OF TRANSFORMER PROTECTION AND METHOD AND SYSTEM OF DETECTING A DEFECTIVE WINDING

[75] Inventors: Keizo Inagaki, Hitachi; Yoshihiro Sano; Yoshiaki Matsui, both of Katsuta; Takafumi Maeda, Tokyo, all of Japan

[73] Assignees: Hitachi, Ltd.; The Tokyo Electric Power Co., Inc., both of Tokyo, Japan

[21] Appl. No.: 466,926

[22] Filed: Jan. 18, 1990

[30] Foreign Application Priority Data

Jan. 20, 1989 [JP] Japan .................................. 1-009745

[51] Int. Cl.$^5$ .............................................. H02H 7/04
[52] U.S. Cl. ......................................... 361/36; 361/79
[58] Field of Search ....................... 361/35, 36, 78, 79, 361/85–87; 324/547

[56] References Cited

U.S. PATENT DOCUMENTS 4,772,978  9/1988  Oura et al. ............................ 361/36
5,014,153  5/1991  Wilkerson ............................. 361/36

FOREIGN PATENT DOCUMENTS

62-89424  4/1987  Japan .

Primary Examiner—Todd E. DeBoer
Attorney, Agent, or Firm—Antonelli, Terry, Stout & Kraus

[57] ABSTRACT

A method and system of transformer protection in which parallel admittance currents indicative of the apparent excitation state of a transformer to be protected are evaluated from the transformer terminal voltages and currents sampled at a proper interval, and discrimination between an internal defect and excitation inrush is made in response to a magnitude of the parallel admittance current, and a breaker opening command is issued in response to a judgement of internal defect. The method and system enables high-accuracy and high-sensitivity fault detection through a simple computation.

10 Claims, 8 Drawing Sheets

METHOD AND SYSTEM OF TRANSFORMER PROTECTION AND METHOD AND SYSTEM OF DETECTING A DEFECTIVE WINDING

BACKGROUND OF THE INVENTION

This invention relates to a method and system of transformer protection and a method of detecting a defective winding, and particularly to a method of transformer protection and method of defective winding detection capable of fast and sensitive operation based on the digital processing in which the terminal voltages and currents of a transformer to be protected are sampled at a proper time interval and the sampled data are subjected to a prescribed computation.

The conventional transformer protection against such abnormalities as short-circuiting of winding is based on the detection of a differential current among the terminal currents of the transformer. Since a differential current arises at the inrush of excitation of the transformer as well as at the occurrence of a defect of a winding, conventional technique is designed to prevent the transformer protection relay from responding to the inrush excitation currents by adopting the "second harmonic suppression system" which utilizes the nature of the inrush excitation current which includes the second harmonic wave in a large proportion.

However, depending on such conditions as the earth capacity and the reactance of the power transmission system and the impedance of the transformer, the current in trouble can include low-order harmonic components near the second harmonic, and the conventional second harmonic suppression system can cause a retardative operation of the transformer protection relay and eventually incur a catastrophic event due to a faulty operation.

As a counter measure against the above impropriety, there is proposed a digital processing system disclosed in Japanese Patent Laid-Open No. 62-89424 (JP-A-62-89424) Specification. The process, as described in the following, is based on the fact that when a transformer is modeled as a multi-terminal network and expressed by the admittance equation, the transfer admittance at the excitation inrush or at the occurrence of an internal defect does not differ significantly from the normal state, whereas the drive-point admittance or the parallel admittance induced from it differs significantly between the excitation inrush and an internal defect. In this specification, the reciprocal of the inductance is termed "admittance" expediently since there is no proper wording thereof.

(1) The transfer admittance of the transformer to be protected is evaluated from the leakage inductance and memorized as a constant in the relay in advance.

(2) Terminal voltages and currents of the transformer are sampled at a proper time interval.

(3) A differential current is evaluated from the sampled terminal currents.

(4) Based on the implication that a differential current in excess of a certain detection level implies the state of internal defect or excitation inrush, the drive-point admittance or parallel admittance is evaluated from the terminal voltages and currents and the memorized transfer admittance and, depending on its magnitude, the discrimination between an internal fault and excitation inrush is made.

(5) If the judgement of internal defect repeats for a certain number of consecutive samples, the breaker opening command is issued so as to disconnect the transformer.

This transformer protection system has outstanding features as compared with the conventional second harmonic suppression system, in that the transfer admittance used as a coefficient of the operational equation is a known constant, allowing the high-accuracy computation and the application to transformers of various types of structure; the discrimination between an internal defect and the excitation inrush is made irrespective of the current waveform, allowing the application to transformers of any power system regardless of the magnitude of earth capacity; and the discrimination between an internal defect and excitation inrush is made on the first wave of the current, allowing the fast relay operation in the event of an internal fault.

However, the foregoing conventional technique involves the following problems.

(1) Computation of the parallel admittance includes the division operation, consuming a lot of time.

(2) When the equation has the denominator of a small value, a large operational error arises, resulting possibly in an erroneous judgement.

(3) The parallel admittance has different values depending on the transformer structure, requiring the setting of a threshold value based on the inference of the value for each transformer, which imposes a cause of erroneous setting.

(4) The parallel admittance at the occurrence of a fault has a constant value, compelling irrationally the event discrimination with the same weighting within a cycle regardless of the magnitude of the current in trouble.

The Japanese Patent Laid-Open No. 62-89424 discloses a method of fault determination without involving the division operation, but by reforming the judgement formulas so that the judgement is based on the polarities of the denominator and numerator. However, the principle of fault determination is identical to the determination based on the value of parallel admittance, and above problems of items (3) and (4) remain unsolved.

SUMMARY OF THE INVENTION

An object of the present invention is to overcome the foregoing prior art deficiencies and to provide a simple method and system of transformer protection and method and system of defective winding detection based on the digital processing capable of high-accuracy operation and judgement.

The present invention is characterized in the computation of parallel admittance currents from the terminal voltages and currents of a transformer to be protected sampled at a proper time interval, and the judgement of an internal defect on the basis of the resulting computation values, thereby accomplishing the high-accuracy and high-sensitivity fault detection even through the simple computation. The brief procedure of the inventive method is as follows.

(1) A differential current is evaluated from the terminal currents of the transformer to be protected, and, based on the magnitude of the differential current, discrimination is made whether the transformer is in a state of internal defect or a state of excitation inrush.

(2) Parallel admittance currents are evaluated from the terminal voltages and currents and the memorized transfer admittance of the transformer, and based on the magnitude of the parallel admittances, the discrimination between an internal defect and excitation inrush is made.

(3) If the judgement of internal defect repeats for a certain number of consecutive samples, the breaker opening command is issued so as to disconnect the transformer from the power system.

DESCRIPTION OF THE PREFERRED EMBODIMENTS

Figure 1:
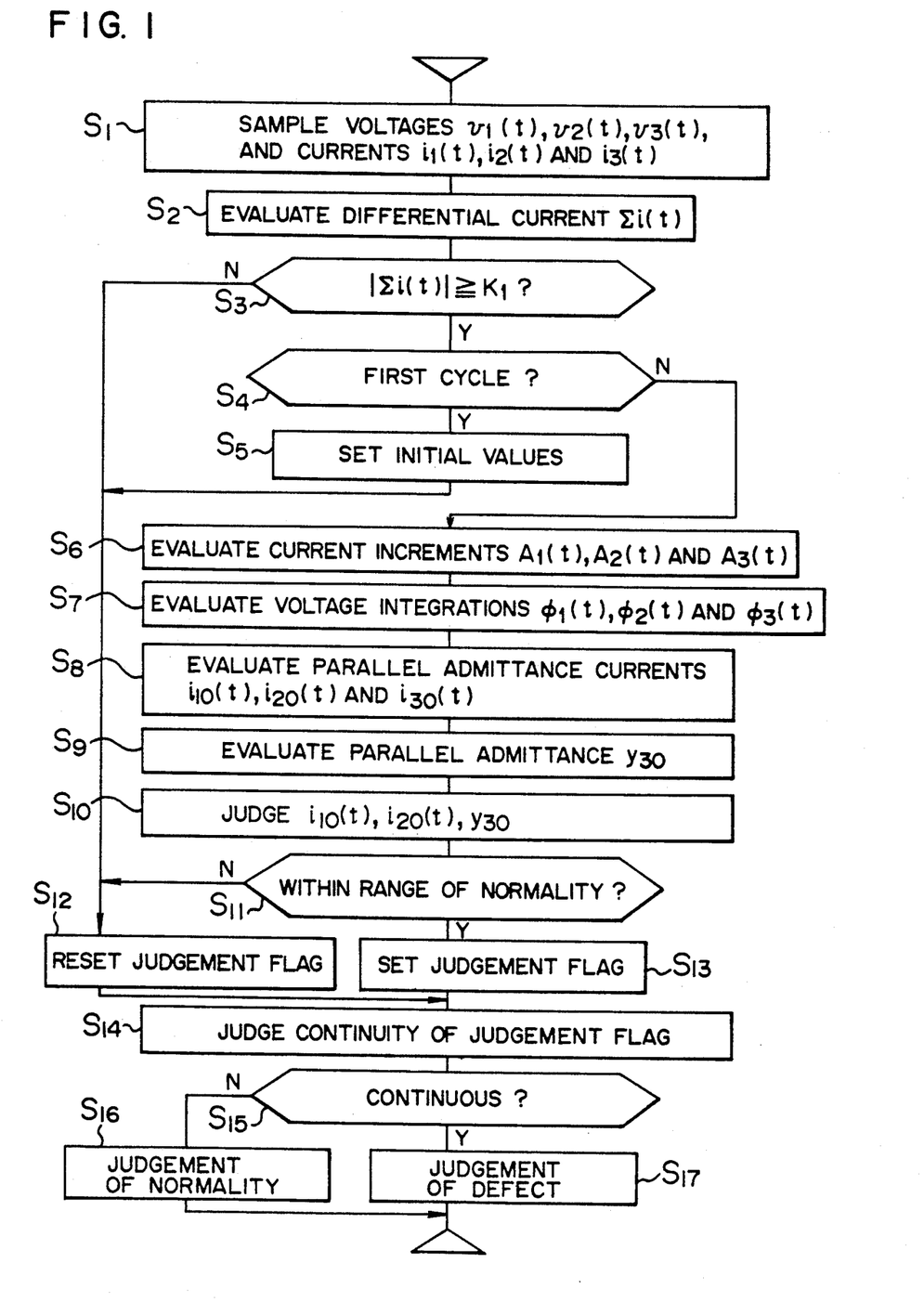
FIG. 1 is a flowchart showing the computation of the inventive method.

The basic arrangement and the operation of the computer used for the inventive method of transformer protection, inclusive of the principal circuit of the transformer under protection, will be described with reference to the block diagram of FIG. 2 and the flowchart of FIG. 1.

Figure 2:
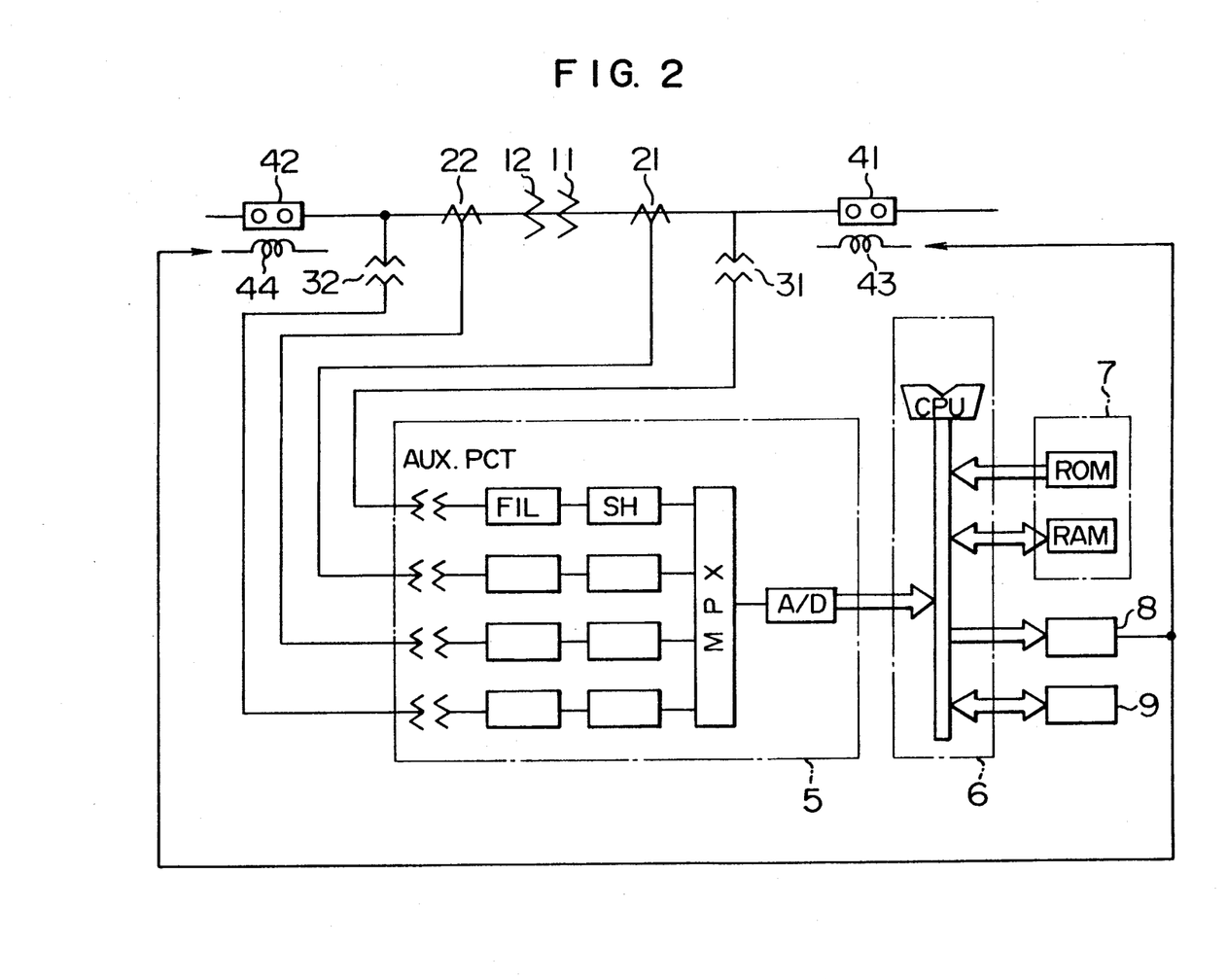
FIG. 2 is a fundamental block diagram showing the computer used in this invention.

In FIG. 2, indicated by 11 and 12 are the primary winding and secondary winding of a transformer to be protected, 21 and 22 are current transformers on the primary and secondary sides, 31 and 32 are voltage transformers on the primary and secondary sides, 41 and 42 are breakers on the primary and secondary sides, 43 and 44 are trip coils of these breakers, and 5 through 9 are components of computer which include an input section 5, a processor section 6, a memory section 7, an output section 8 and a coefficient setting section 9. The input section 5 comprises auxiliary voltage and current transformers Aux. PCT's for implementing the level conversion for the voltages and currents of the main circuit, filters FILs for eliminating harmonic components that are not needed for the protective operation, sample holders SH's for sample-holding the instantaneous input values, a multiplexer MPX which selects one of outputs of the sample-holders sequentially, and an analog-to-digital converter A/D. The processor section 6 comprises a main processing unit CPU which performs control and computation, a data bus and an address bus. The memory section 7 comprises a ROM (Read Only Memory) for storing programs, and a RAM (Random Access Memory) for holding data. The memory section may include a rewritable nonvolatile memory, e.g., semiconductor nonvolatile memory, EAROM, for the revisal storage of coefficients. The output section 8 delivers the digital computation and judgement results including the breaker trip allowance signal. The coefficient setting section 9 is for setting and displaying the coefficients of equations, relay settlement values, etc., and it may be designed to display and deliver the computation and judgement results, in addition.

Before entering into the explanation of the operational flowchart of FIG. 1, the equivalent circuit of a transformer, the admittance characteristics of the equivalent circuit, and the method of discrimination between an internal defect and excitation inrush based on the parallel admittance currents in the equivalent circuit will be described as a basic idea of this invention by taking an example of a three-winding transformer.

First, the admittance equation of the transformer, the equivalent circuit of the transformer and the admittance characteristics, that are described in the Japanese Patent Laid-Open No. 62-89424, will be explained briefly using FIGS. 3 to 8.

Figure 3:
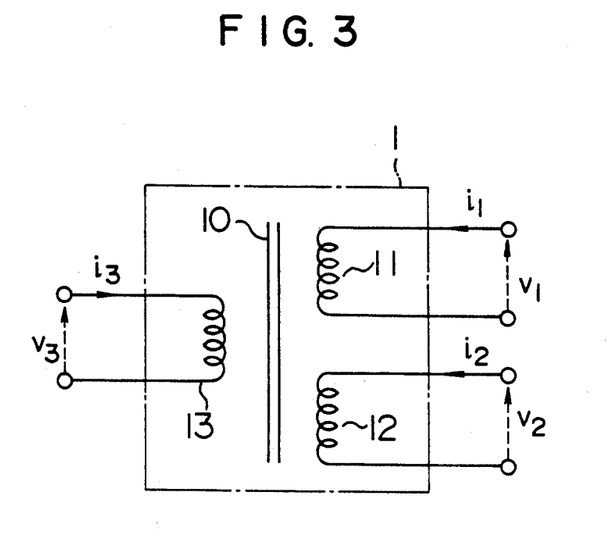
FIG. 3 is a schematic diagram of a three-winding transformer.

FIG. 3 is a schematic diagram of a single-phase three-winding transformer, in which indicated by 10 is an iron core, and 11, 12 and 13 are primary, secondary and tertiary windings. Indicated by $i_1$, $i_2$ and $i_3$ are the primary, secondary and tertiary currents, and $v_1$, $v_2$ and $v_3$ are the primary, secondary and tertiary voltages. Supposing the three-winding transformer of FIG. 3 to be a multi-terminal network, the voltages and currents relate mutually as shown generally by the following admittance equation (1), regardless of the states of normal operation, excitation inrush or internal defect.

$$\begin{bmatrix} i_1 \\ i_2 \\ i_3 \end{bmatrix} = \begin{bmatrix} y_{11} & y_{12} & y_{13} \\ y_{21} & y_{22} & y_{23} \\ y_{31} & y_{32} & y_{33} \end{bmatrix} \begin{bmatrix} \int v_1 dt \\ \int v_2 dt \\ \int v_3 dt \end{bmatrix} \quad (1)$$

In the admittance matrix on the right side of the equation (1), the diagonal elements $y_{11}$, $y_{22}$ and $y_{33}$ are called "drive-point admittances" and the nondiagonal elements $y_{12}$, $y_{13}$, $y_{23}$, and so on are called "transfer admittances". For the sake of simplicity, the three-winding transformer of FIG. 3 is assumed to have the windings of an equal number of turns. With the assumption that the voltages and currents are normalized to an arbitrary reference number of turns, the admittance matrix on the right side of equation (1) is a symmetric matrix having six independent admittance elements $y_{11}$, $y_{22}$, $y_{33}$, $y_{12}$ ($=y_{21}$), $y_{13}$ ($=y_{31}$), and $y_{23}$ ($=y_{32}$).

Figure 4:
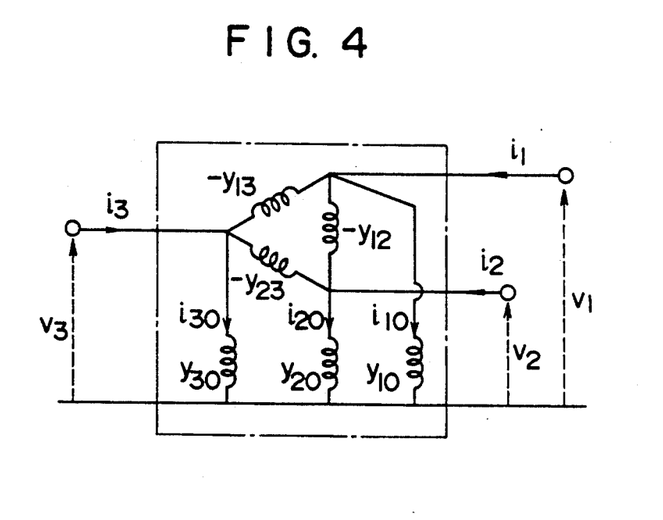
FIG. 4 shows an equivalent circuit of the three-winding transformer.

FIG. 4 shows the equivalent circuit of the three-winding transformer which consists of six independent elements and meets the equation (1). In the figure, $y_{10}$, $y_{20}$ and $y_{30}$ are called "parallel admittances", and they relate to the drive-point admittances and transfer admittances through the following equations (2).

$$\begin{cases} y_{10} = y_{11} + y_{12} + y_{13} \\ y_{20} = y_{21} + y_{22} + y_{23} \\ y_{30} = y_{31} + y_{32} + y_{33} \end{cases} \quad (2)$$

Sections $-y_{12}$, $-y_{13}$ and $-y_{23}$ in FIG. 4 correspond to the generally used delta-collected equivalent circuit of a three-winding transformer, and each admittance has a virtually constant value regardless of the states of normal operation, excitation inrush or internal defect. The following explains the method of evaluating these admittances from the normal-state leakage inductances.

Figure 5:
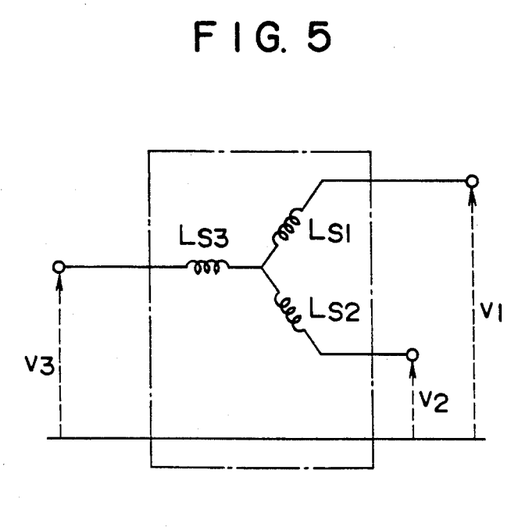
FIG. 5 shows an equivalent circuit of a star-connected three-winding transformer.

The leakage inductances between the primary and secondary windings, between the primary and tertiary windings, and between the secondary and tertiary windings normalized to the reference number of turns are termed $L_{12}$, $L_{13}$ and $L_{23}$, respectively. Generally, a three-winding transformer in the normal state can be expressed by a star-connected equivalent circuit shown in FIG. 5 or a delta-connected equivalent circuit shown in FIG. 6. As it is known in the art, the star-connected equivalent circuit has the following element values.

$$\begin{cases} L_{S1} = (L_{12} + L_{13} - L_{23})/2 \\ L_{S2} = (L_{12} - L_{13} + L_{23})/2 \\ L_{S3} = (-L_{12} + L_{13} - L_{23})/2 \end{cases} \quad (3)$$

Figure 6:
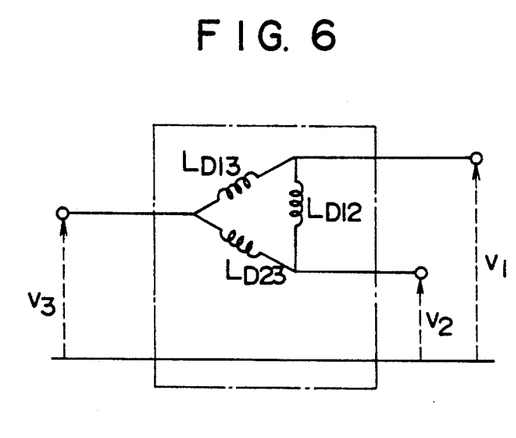
FIG. 6 shows an equivalent circuit of a delta-connected three-winding transformer.

Through the star-delta conversion, the delta-connected equivalent circuit has the following element values.

$$\begin{cases} L_{D12} = L_{SS}/L_{S3} \\ L_{D13} = L_{SS}/L_{S2} \\ L_{D23} = L_{SS}/L_{S1} \end{cases} \quad (4)$$

where $L_{SS} = L_{S1}L_{S2} + L_{S1}L_{S3} + L_{S2}L_{S3}$. Since $Y_{10} = y_{20} = y_{30} = 0$ in the normal state, the comparison of FIGS. 4 and 6 reveals that the transfer admittances are given as follows.

$$\begin{cases} Y_{12} = -1/L_{D12} \\ Y_{13} = -1/L_{D13} \\ Y_{23} = -1/L_{D23} \end{cases} \quad (5)$$

Reforming the equation (1), the drive-point admittances can be expressed by the following equations (6).

$$\begin{cases} y_{11} = \{i_1 - (y_{12}\int v_2 dt + y_{13}\int v_3 dt)\}/\int v_1 dt \\ y_{22} = \{i_2 - (y_{21}\int v_1 dt + y_{23}\int v_3 dt)\}/\int v_2 dt \\ y_{33} = \{i_3 - (y_{31}\int v_1 dt + y_{32}\int v_2 dt)\}/\int v_3 dt \end{cases} \quad (6)$$

By evaluating the transfer admittances $y_{12}$, $y_{13}$ and $y_{23}$ from the leakage inductances in the normal state and memorizing them as constants inside the relay, and by sampling the multi-terminal voltages and currents of the transformer at a proper time interval, then the drive-point admittances $y_{11}$, $y_{22}$ and $y_{33}$ can be calculated by using the equations (6). Moreover, the parallel admittances $y_{10}$, $y_{20}$ and $y_{30}$ can be calculated by using the equations (2).

Figure 7:
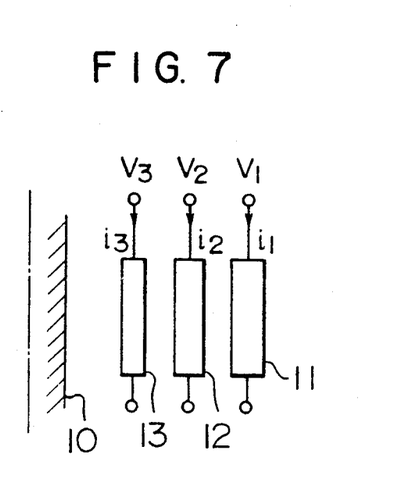
FIG. 7 is a diagram showing the disposition of the wirings of the three-winding transformer.

FIG. 7 shows the structure of a three-winding transformer, and FIG. 8 shows the parallel admittance characteristics at the excitation inrush and internal defect, as examples. In FIG. 7, indicated by 10 is an iron core, and 11, 12 and 13 are primary, secondary and tertiary windings. In FIG. 8, shown by (a), (b), (c) and (d) are the cases of an excitation inrush, a short-circuiting of primary winding, a short-circuiting of secondary winding and a short-circuiting of tertiary winding, respectively. FIG. 8(a) is a plot on the horizontal axis of the source voltage through-in phase $\theta$, with $B_R$ being the residual magnetic flux density. FIG. 8 (b), (c) and (d) are plots on the horizontal axis of the proportion f of the number of short-circuited turns relative to the total number of turns of each winding. The figure reveals that the excitation current is negligibly small in the normal state (f=0 in FIG. 8 (b)-(d)), and the parallel admittances $y_{10}$, $y_{20}$ and $y_{30}$ are virtually zero. At the excitation inrush (FIG. 8 (a)), the parallel admittance $y_{30}$ for the inner tertiary winding 13 nearest to the iron core foot has the largest value with a positive polarity, while the $y_{10}$ for the outermost primary winding 11 has a smaller value with a positive polarity. The $y_{20}$ for the intermediate secondary winding 12 is virtually zero. At an internal defect, only the defective winding has its related parallel admittances increasing positively in proportion to the number of short-circuited turns, while the remaining two parallel admittances stay zero or goes in the negative direction.

The method of discrimination between an internal defect and excitation inrush depending on the values of parallel admittances by utilization of the difference of parallel admittances, as explained above, is disclosed in the above-mentioned patent Laid-Open No. 62-89424, with its features being described in the paragraph of Background of the Invention of the present invention. The method involves the problem as described in the same paragraph.

Next, the method of defect determination based on the parallel admittance currents according to the present invention will be explained.

In the equivalent circuit of the three-winding transformer shown in FIG. 3, the currents $i_{10}$, $i_{20}$ and $i_{30}$ flowing through the parallel admittances $y_{10}$, $y_{20}$ and $y_{30}$, respectively, are defined to be parallel admittance currents. During the normal operation and at the excitation inrush, the transformer has an excitation current equal to the sum of the $i_{10}$, $i_{20}$ and $i_{30}$. Namely, the parallel admittance currents represent the excitation state of the transformer. With the state of internal defect being included, the parallel admittance currents represent the apparent excitation state of the transformer.

FIG. 4 provides the following equations (7).

$$\begin{cases} i_{10} = y_{10}\int v_1 dt \\ i_{20} = y_{20}\int v_2 dt \\ i_{30} = y_{30}\int v_3 dt \end{cases} \quad (7)$$

By substituting the equations (2) into the equations (7), and rearranging the equations using the equations (6), the following equations (8) result.

$$\begin{cases} i_{10} = i_1 + (y_{12} + y_{13})\int v_1 dt - y_{12}\int v_2 dt - y_{13}\int v_3 dt \\ i_{20} = i_2 - y_{21}\int v_1 dt + (y_{21} + y_{23})\int v_2 dt - y_{23}\int v_3 dt \\ i_{30} = i_3 - y_{31}\int v_1 dt - y_{32}\int v_2 dt + (y_{31} + y_{32})\int v_3 dt \end{cases} \quad (8)$$

The following explains the manner of quantization in computing the parallel admittances by use of the equations (8). Since the voltages and currents are functions of time, they are given the appendant (t) hereinafter. The equations (8), which include the terms of time integration, are reformed with the integration start time being set as t=t₀, resulting in the following equations (9).

$$i_{10}(t) = i_1(t) - i_1(t_0) + (y_{12} + y_{13}) \int_{t_0}^{t} v_1(t)dt - y_{12} \int_{t_0}^{t} v_2(t)dt - y_{13} \int_{t_0}^{t} v_3(t)dt$$

$$i_{20}(t) = i_2(t) - i_2(t_0) - y_{21} \int_{t_0}^{t} v_1(t)dt + (y_{21} + y_{23}) \int_{t_0}^{t} v_2(t)dt - y_{23} \int_{t_0}^{t} v_3(t)dt \quad (9)$$

$$i_{30}(t) = i_3(t) - i_3(t_0) - y_{31} \int_{t_0}^{t} v_1(t)dt - y_{32} \int_{t_0}^{t} v_2(t)dt + (y_{31} + y_{32}) \int_{t_0}^{t} v_3(t)dt$$

Application of the trapezoidal rule, for example, with the sampling interval being $\Delta t$, to the integration operation, the equations are reduced to as follows.

$$\begin{cases} \int_{t_0}^{t} v_1(t)dt = \phi_1(t) \\ \qquad = \phi_1(t - \Delta t) + \frac{\Delta t}{2}\{v_1(t) + v_1(t - \Delta t)\} \\ \int_{t_0}^{t} v_2(t)dt = \phi_2(t) \\ \qquad = \phi_2(t - \Delta t) + \frac{\Delta t}{2}\{v_2(t) + v_2(t - \Delta t)\} \\ \int_{t_0}^{t} v_3(t)dt = \phi_3(t) \\ \qquad = \phi_3(t - \Delta t) + \frac{\Delta t}{2}\{v_3(t) + v_3(t - \Delta t)\} \end{cases} \quad (10)$$

where initial values of integration are given as follows.

$$\phi_1(t_0) = \phi_2(t_0) = \phi_3(t_0) = 0 \quad (11)$$

Increments of current are termed as follows.

$$\begin{cases} A_1(t) = i_1(t) - i_1(t_0) \\ A_2(t) = i_2(t) - i_2(t_0) \\ A_3(t) = i_3(t) - i_3(t_0) \end{cases} \quad (12)$$

And, the parallel admittance currents are given by the following equations (13).

$$\begin{cases} i_{10}(t) = A_1(t) + (y_{12} + y_{13})\phi_1(t) - y_{12}\phi_2(t) - y_{13}\phi_3(t) \\ i_{20}(t) = A_2(t) - y_{21}\phi_1(t) + (y_{21} + y_{23})\phi_2(t) - y_{23}\phi_3(t) \\ i_{30}(t) = A_3(t) - y_{31}\phi_1(t) - y_{32}\phi_2(t) + (y_{31} + y_{32})\phi_3(t) \end{cases} \quad (13)$$

The following is obvious from the foregoing computation process.

$$i_{10}(t_0) = i_{20}(t_0) = i_{30}(t_0) = 0 \quad (14)$$

The equations (7) reveal obviously that the magnitude of each parallel admittance current is proportional to the value of parallel admittance. Accordingly, the comparison of each parallel admittance value at the excitation inrush and at an internal defect reflects directly the comparison of each parallel admittance current. For example, the currents at the excitation inrush relate as shown by (15);

$$|i_{30}(t)| > |i_{10}(t)|, |i_{20}(t)| \quad (15)$$

whereas, the currents by a defective primary winding relate as shown by (16).

$$|i_{10}(t)| > |i_{20}(t)|, |i_{30}(t)| \quad (16)$$

Accordingly, it is possible to discriminate between an internal defect and the excitation inrush on the basis of the comparison of the parallel admittance currents.

The following explains a specific example of the method of discrimination between an internal defect and the excitation inrush. The sum of the currents is termed as follows.

$$\Sigma i_0(t) = i_{10}(t) + i_{20}(t) + i_{30}(t) \quad (17)$$

The $\Sigma i_0(t)$ corresponding to the differential current flows in shunt through the branches of three parallel admittance elements in the equivalent circuit shown in FIG. 4, and it is conceived that the state of current branching differs between the excitation inrush and an internal defect. At the excitation inrush, the $\Sigma i_0(t)$ flows dominantly through the branch of $y_{30}$, whereas at an internal defect of the primary winding, it flows mostly through the branch of $y_{10}$, and at an internal defect of the secondary winding, it flows mostly through the branch of $y_{20}$. Based on such distinctive affairs of current branching, the event is determined to be an internal defect in any of the following cases, with parameters being set as $K_2 = 0.5$ and $k_3 = 0$.

$$|i_{10}(t)| - K_2|\Sigma i_0(t)| > K_3 \quad (18)$$

$$|i_{20}(t)| - K_2|\Sigma i_0(t)| > K_3 \quad (19)$$

Namely, in case a half or more of the $\Sigma i_0(t)$ flows through the branch of $y_{10}$ or $y_{20}$, the fault is an internal defect, instead of the excitation inrush.

The foregoing method of fault discrimination based on the parallel admittance currents is characterized in that the computation time is short and the computation error is small because of the absence of the division operation among the variables; specific threshold values for different transformer structures are not required for the fault discrimination; and the fault discrimination is implemented on the basis of the parallel admittance currents which correspond to the magnitude of differential current, whereby the prior art deficiencies mentioned in the paragraph of Background of the Invention can be overcome.

On the other hand, the equations (18) and (19) cannot determine a defect of the innermost tertiary winding which is located nearest to the core foot, and it necessitates a separate method. The following explains, as an example, the discrimination method based on the value of $y_{30}$. From the equations (7) and by the quantization of operational equations, the $y_{30}$ is evaluated by the following equation (20).

$$y_{30}=i_{30}(t)/\phi_3(t) \tag{20}$$

Figure 8A:
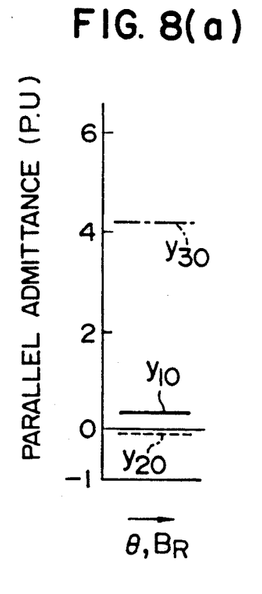
FIG. 8(a)-(d) show characteristic diagrams of the parallel admittance of the three-winding transformer.
Figure 8B:
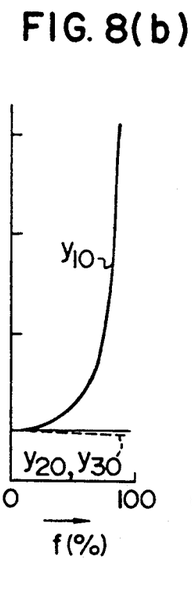
Figure 8C:
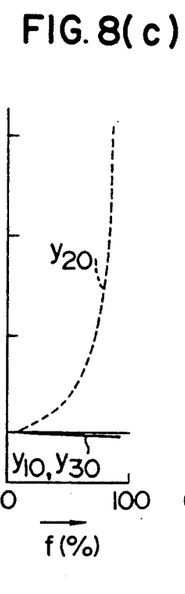
Figure 8D:
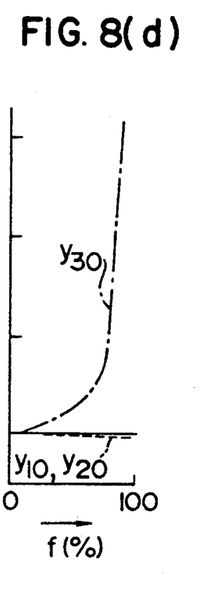

In the parallel admittance characteristics shown in FIG. 8, a defect of the tertiary winding of FIG. 8(d) can result in an equal value of $y_{30}$ to the case of the excitation inrush of FIG. 8(a) depending on the short-circuited turn. To cope with this matter, a threshold value $\alpha$ is used for judgement above the $y_{30}$ at the excitation inrush and another threshold value $\beta$ below it, and an internal defect is judged in any of the following cases.

$$y_{30}>\alpha \tag{21}$$

$$y_{30}<\beta \tag{22}$$

By reforming the formulas (20) to (22) so that an internal defect is judged in any of the following cases, the division operation can be excluded from computation.

$$i_{30}(t)-\alpha\phi_3(t)>0 \tag{23}$$

$$i_{30}(t)-\beta\phi_3(t)<0 \tag{24}$$

The value of $y_{30}$ at the excitation inrush or defective tertiary winding is larger than the values of $y_{10}$ and $y_{20}$, and the influence of computation error is relatively small. The defective tertiary winding has its $y_{30}$ value becoming virtually equal to the case of excitation inrush when it involves as large number of short-circuited turns as total shorting. Such a fault, if occurs actually, begins with shorting of a small number of turns, which can be detected during the progress of defect on the basis of the formula (22) or (23), and no practical problem is left. The use of the formula (22) or (23) also enables to discriminate defects on the primary winding and secondary winding in a duplex fashion with the discrimination using the formulas (18) and (19), whereby the reliability of fault detection is enhanced.

Next to the explanation of the basic idea of this invention, the operational steps of the inventive method of the case of being applied to the protection of a three-winding transformer will be described in detail with reference to the flowchart of FIG. 1.

Initially at step $S_1$, the voltage $v_1(t)$, $v_2(t)$ and $v_3(t)$ and the currents $i_1(t)$, $i_2(t)$ and $i_2(t)$ at time t are sampled. These voltages and currents are assumed to be normalized to an arbitrary reference number of turns.

Step $S_2$ evaluates the differential current $\Sigma i(t)$ from the following equation (25).

$$\Sigma i(t)=i_1(t)+i_2(t)+i_3(t) \tag{25}$$

Step $S_3$ judges as to whether the absolute value of $\Sigma i(t)$ is larger than the prescribed threshold level $K_1$. If it is smaller than $K_1$, the sequence proceeds to step $S_{12}$, otherwise if it is larger than $K_1$, indicative of the excitation inrush or an internal defect, the sequence proceeds to step $S_4$.

Step $S_4$ judges as to whether or not the absolute value of the differential current $\Sigma i(t)$ in excess of the threshold level has been detected at the first sampling. If the value is larger than $K_1$ continuously from the previous sampling, the sequence proceeds to step $S_5$. In the case of an internal defect, there can be a case at the transition of the polarity of $\Sigma i(t)$ in which the $\Sigma i(t)$ with a negative polarity is larger than $K_1$ at the previous sampling, and it is, with a positive polarity, larger than $K_1$ at the present sampling. In this case, the judgement of the first sampling may be made in response to the detection of the transition of polarity of the $\Sigma i(t)$.

Step $S_5$ sets the initial values as follows. First, $i_1(t)$, $i_2(t)$ and $i_3(t)$ are memorized for $t=t_0$. Next, $\phi_1(t_0)$, $\phi_2(t_0)$ and $\phi_3(t_0)$ are cleared for the integration areas of $v_1(t)$, $v_2(t)$ and $v_3(t)$. Following the initialization, the sequence proceeds to step $S_{12}$.

Step $S_6$ evaluates the increments of current $A_1(t)$, $A_2(t)$ and $A_3(t)$ from the equations (12), and step $S_7$ evaluates the voltage integrations $\phi_1(t_0)$, $\phi_2(t_0)$ and $\phi_3(t_0)$ from the equations (10).

Step $S_8$ evaluates the parallel admittance currents $i_{10}(t)$, $i_{20}(t)$ and $i_{30}(t)$ from the equations (13), and step $S_9$ evaluates the parallel admittance $y_{30}$ from the equation (20).

Next, the method of judgement for the parallel admittance currents and parallel admittances in steps $S_{10}$ to $S_{13}$ will be explained.

First the $\Sigma i_0(t)$ is evaluated from the equation (17), and the left terms of the equations (18) and (19) are computed. Next, judgement is made as to whether the conditions (18), (19), (21) and (22) are satisfied. If one of these four conditions is met, indicative of the possibility of an internal defect, the abnormality judgement flag is set, or otherwise the flag is reset.

In order to detect an internal defect correctly and to issue the breaker trip allowance signal continuously, step $S_{14}$ and $S_{15}$ check the continuity of the judgement flag. There are several methods for this step as follows.

(a) The continuity is recognized if the judgement flag is set a plurality of number of times, e.g., twice or three times, consecutively.

(b) The continuity is recognized if the judgement flag is set a plurality of number of times consecutively or intermittently during a certain time length, e.g., over an operating cycle of the main circuit.

(c) The continuity is recognized continuously for a certain duration, e.g., over an operating cycle, once the continuity has been recognized.

In the case of a judgement of continuity, step $S_{17}$ determines the event to be a fault and issues the breaker trip allowance signal, otherwise step $S_{16}$ makes the judgement of normality. The trip allowance signal is a signal for tripping the breaker by itself alone or in combination with conditions provided by other fault detecting elements.

The computation takes place for instantaneous values, and therefore the values on the left terms of equations (18) and (19) vary at each sampling. The parallel admittance current values may be averaged over an operating cycle by summing absolute values of 12 samples, in case the sampling interval is equal to a 30-degrees electrical angle, for example, with the judgement formulas (18) and (19) being replaced with the following formulas (26) and (27).

$$\begin{cases} \sum\limits_{}^{12} |i_{10}(t)| - K_2 \sum\limits_{}^{12} |\Sigma i_0(t)| > K_3 \\ \sum\limits_{}^{12} |i_{20}(t)| - K_2 \sum\limits_{}^{12} |\Sigma i_0(t)| > K_3 \end{cases} \tag{27}$$

In the case of a grounding or shorting on the part of the external power system, fault currents will flow into the transformer, and a differential current may be created due to the error of the current transformers depending on the magnitude of the fault current and its d.c. component. If such an erroneous differential current exceeds the detection level, an erroneous judgement of internal defect can possibly result when the foregoing method is used. This impropriety is prevented by the following fault judgement condition based on the "pass-current suppression", with parameters being set as $K_4=0.3$ and $K_5=0$.

$$|\Sigma i| - K_4(|i_1| + |i_2| + |i_3|) > K_5 \qquad (28)$$

Figure 9:
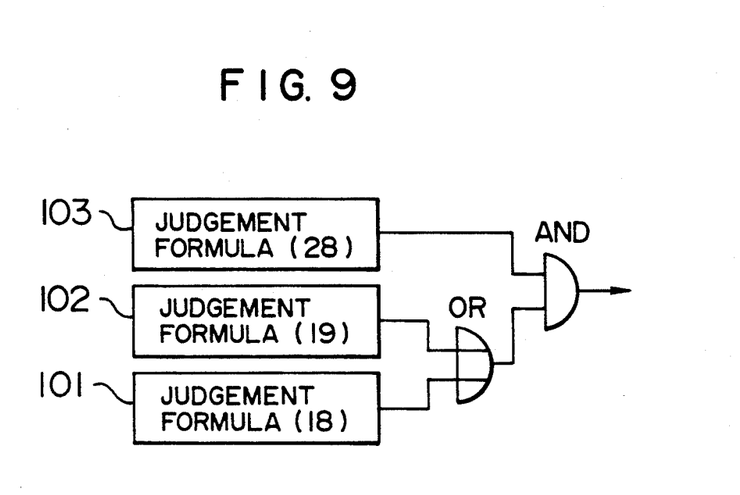
FIGS. 9 to 12 are diagrams showing the arrangement of the fault judgement elements according to this invention.

FIG. 9 shows an example of the arrangement of the fault judgement elements of this kind. In the figure, indicated by 101 and 102 are judgement elements based on the formulas (18) and (19) using the parallel admittance currents, and indicated by 103 is a judgement element for pass current suppression based on the formula (28). Using an OR gate and an AND gate, as shown in FIG. 9, even if any of the formula (18) or (19) is satisfied to indicate a defect, the trip signal is not issued unless the formula (28) is met, and the erroneous protective operation caused by an external trouble can be prevented.

Figure 10:
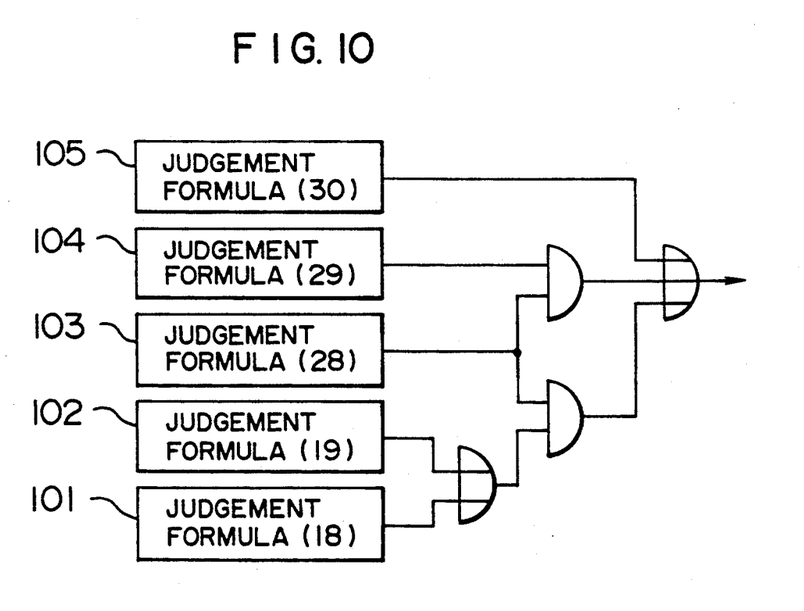

FIG. 10 shows another example of the arrangement of the fault judgement element. Portions in FIG. 10 identical to those of FIG. 9 are referred to by the same symbols and explanation thereof will not be repeated. The arrangement of FIG. 10 differs from FIG. 9 in the addition of judgement elements 104 and 105. The element 104 employs "second harmonic suppression" based on the following formula of judgement (29) as an example.

$$|\Sigma i_{f1}| - K_6|\Sigma i_{f2}| > K_7 \qquad (29)$$

where $\Sigma i_{f1}$ and $\Sigma i_{f2}$ are the fundamental component and second harmonic component of the differential current $\Sigma i$, respectively, and parameters are set as $K_6=0.15$ and $K_7=0$, for example. Depending on the system condition on the primary side or secondary side, a low-order harmonic current near the second harmonic wave arises at a fault of the primary winding or secondary winding, in which case the element 104 can not determine the fault. Even in such a system condition, the low-order harmonic current caused by a defect of the tertiary winding, which is generally on the lower-voltage side, is small. Accordingly, a tertiary winding defect can be determined fast enough by the element 104, and the disability of the arrangement of FIG. 9 in determining a tertiary winding defect can be overcome. Indicated by 105 is a judgement element responsive to the "instantaneous over current", and it bases on the following formula of judgement (30).

$$|\Sigma i| - K_8 > K_9 \qquad (30)$$

Parameter $K_8$ is set to five times the value of the rated current, and $K_9$ is set to zero, for example. By the addition of the judgement element 105, the breaker trip signal can be produced promptly regardless of the current waveform and the like at the occurrence of such a serious trouble as the total shorting of a winding.

Figure 11:
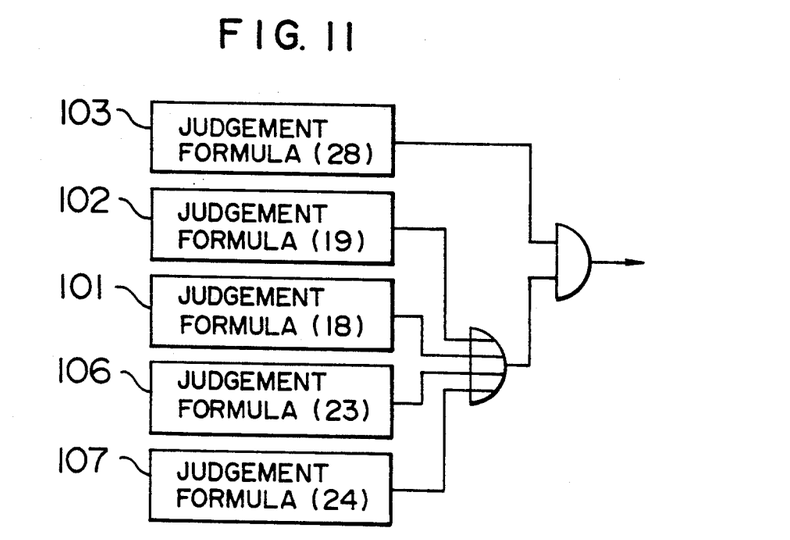

FIG. 11 shows another example of the arrangement of the fault judgement element. Portions in FIG. 11 identical to those of FIG. 9 are referred to by the same symbols and the explanation thereof will not be repeated. The arrangement of FIG. 11 differs from FIG. 9 in the addition of judgement elements 106 and 107. The elements 106 and 107 are based on the equations (23) and (24) using the parallel admittance $y_{30}$. As mentioned previously, it becomes possible to detect any defect of winding, in a practical sense, to produce the trip signal without relying on the judgement based on the second harmonic suppression.

Figure 12:
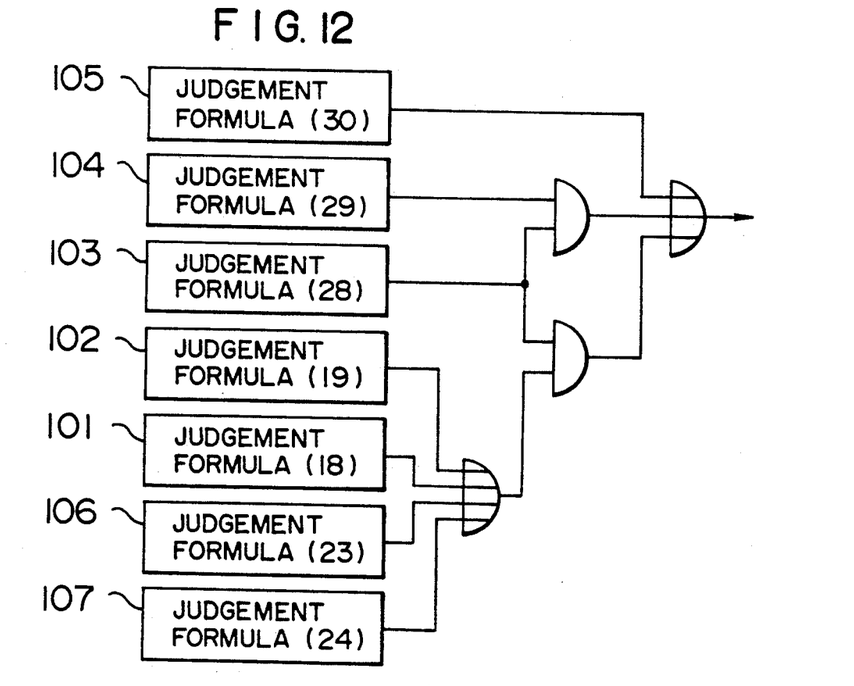

FIG. 12 shows a further example of the arrangement of fault judgement element. Portions in FIG. 12 identical to those of FIG. 11 are referred to by the same symbols and the explanation thereof will not be repeated. The arrangement of FIG. 12 differs from FIG. 11 in the addition of judgement elements 104 and 105. In FIG. 12, the elements 104 and 105 are the same judgement elements having the same symbols in FIG. 10. The element 104 is based on the second harmonic suppression of the equation (29), and the element 105 is based on the instantaneous over current of the equation (30). The arrangement enables a single internal defect to be discriminated by means of more than one judgement element, whereby the reliability of fault detection is enhanced.

Figure 13:
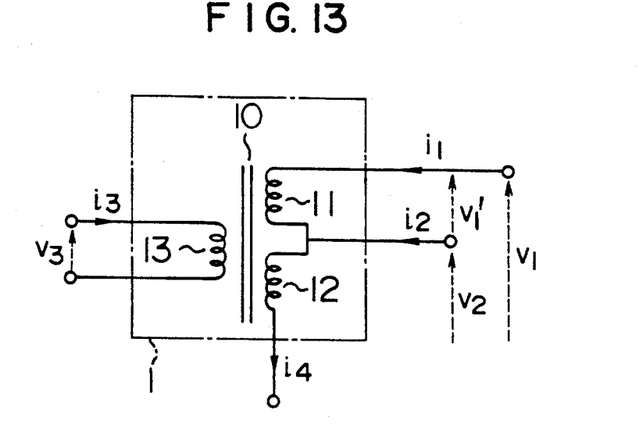
FIG. 13 is a schematic diagram showing the wiring of a single-winding transformer.

The following explains that the present invention is applicable not only to separate-winding transformers, but also to single-winding transformers, with reference to FIG. 13. FIG. 13 is a schematic diagram, in which indicated by 1 is a single-winding transformer to be protected, 10 is an iron core, and 11, 12 and 13 are a series winding, a shunt winding and a tertiary winding, respectively. The single-winding transformer shown in FIG. 13 is a three-winding transformer having three windings 11, 12 and 13, with voltages and currents on these windings being denoted by $v_1'$, $v_2$, $v_3$, $i_1$, $i_4$, and $i_3$, respectively. Alternatively, the transformer is conceivable to be a three-winding transformer made up of a primary winding 11 plus 12, a secondary winding 12, and a tertiary winding 13, with their voltages and currents being denoted by $v_1$, $v_2$, $v_3$, $i_1$, $i_2$, and $i_3$, respectively.

Although the present invention applied to a three-winding transformer has been explained, the invention is applicable not only to three-winding transformers, but also to transformers with four or more windings, as well as to two-winding transformer. The following explains in brief an embodiment of this invention applied to a two-winding transformer.

Figure 14:
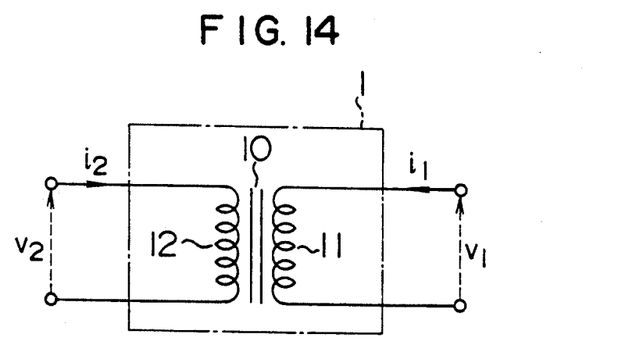
FIG. 14 is a schematic diagram showing the wiring of a two-winding transformer.

FIG. 14 is a schematic diagram of a single-phase two-winding transformer, in which indicated by 10 is an iron core, and 11 and 12 are a primary and secondary windings, respectively. In the figure, $i_1$ and $i_2$ denote the primary and secondary currents, and $v_1$ and $v_2$ denote the primary and secondary voltages. Supposing the two-winding transformer of FIG. 14 to be a four-terminal network, the voltages and currents relate mutually as shown by the following admittance equation (31) regardless of the state of normal operation, excitation inrush or internal defect.

$$\begin{bmatrix} i_1 \\ i_2 \end{bmatrix} = \begin{bmatrix} y_{11} & y_{12} \\ y_{21} & y_{22} \end{bmatrix} \begin{bmatrix} \int v_1 dt \\ \int v_2 dt \end{bmatrix} \qquad (31)$$

In the admittance matrix on the right side of the equation (31), the diagonal elements $y_{11}$ and $y_{22}$ are drive-point admittances, and nondiagonal elements $y_{12}$ and $y_{21}$ are transfer admittances. For the sake of simplicity, the two-winding transformer of FIG. 14 is assumed to have the primary and secondary windings with a same number of turns. With the assumption that the voltages and currents are normalized to an arbitrary number of turns, the admittance matrix on the right side of the equation (31) becomes a symmetrical matrix having three independent admittance elements $y_{11}$, $y_{22}$ and $y_{12}$ ($=y_{21}$).

Figure 15:
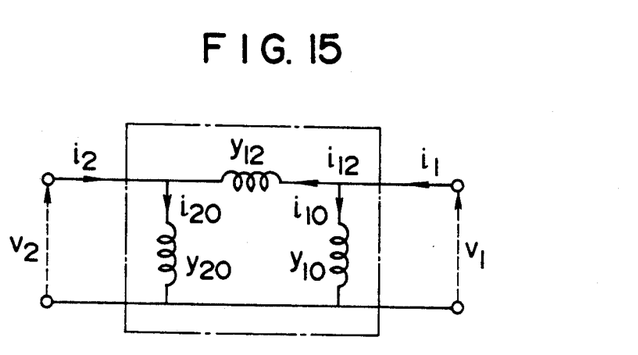
FIG. 15 shows an equivalent circuit of the two-winding transformer.

FIG. 15 shows an equivalent circuit with three independent elements for the two-winding transformer which meets the equation (31). Indicated in FIG. 15 by $y_{10}$ and $y_{20}$ are parallel admittances, which relate with each other through the drive-point admittances and transfer admittance and the following equations (32).

$$\begin{cases} y_{10} = y_{11} + y_{12} \\ y_{20} = y_{21} + y_{22} \end{cases} \quad (32)$$

The section of $-y_{12}$ in FIG. 15 corresponds to the leakage inductance of the two-winding transformer, with its value being virtually constant regardless of the state of normal operation, excitation inrush or internal defect. For the leakage inductance $L_{12}$ between the primary and secondary windings normalized to the reference number of turns, the transfer admittance is given as follows.

$$Y_{12} = -1/L_{12} \quad (33)$$

By reforming the equation (31), the drive-point admittances can be expressed by the following equations (34).

$$\begin{cases} y_{11} = \{i_1 - y_{12}\int v_2 dt\}/\int v_1 dt \\ y_{22} = \{i_2 - y_{21}\int v_1 dt\}/\int v_2 dt \end{cases} \quad (34)$$

The parallel admittance characteristics at excitation inrush and internal defect of the two-winding transformer having a concentric arrangement of the outer primary winding and inner secondary winding, as in the case of the preceding example of the three-winding transformer shown in FIG. 7, are identical to the counterpart shown in FIG. 8. Namely, the parallel admittance $y_{10}$ of the primary winding wound on the outer layer of the two-winding transformer has the same characteristics as of the parallel admittance $y_{10}$ of the outermost primary winding of the three-winding transformer. The parallel admittance $y_{20}$ of the secondary winding wound on the inner layer of the two-winding transformer has the same characteristics as of the parallel admittance $y_{30}$ of the innermost tertiary winding of the three-winding transformer.

In the equivalent circuit of FIG. 15 for the two-winding transformer, the currents $i_{10}$ and $i_{20}$ flowing through the parallel admittance elements $y_{10}$ and $y_{20}$ are defined to be parallel admittance currents. The excitation current of the transformer during the normal operation and excitation inrush is the sum of the $i_{10}$ and $i_{20}$. Namely, the parallel admittance currents represent the excitation state of the transformer. With the state of internal defect being included, the parallel admittance currents represent the apparent excitation state of the transformer.

FIG. 15 provides the following equation (35).

$$\begin{cases} i_{10} = y_{10}\int v_1 dt \\ i_{20} = y_{20}\int v_2 dt \end{cases} \quad (35)$$

Substituting the equations (32) into the equations (35) and rearranging the equations using the equations (34) results in the following equations (36).

$$\begin{cases} i_{10} = i_1 + y_{12}\int v_1 dt - y_{12}\int v_2 dt \\ i_{20} = i_2 - y_{21}\int v_1 dt + y_{21}\int v_2 dt \end{cases} \quad (36)$$

The method of quantization in computing the parallel admittance currents using the equations (36) and the method of discrimination between an internal defect and the excitation inrush are identical to the case of the three-winding transformer, as will be readily inferred from the above description on the three-winding transformer, and the explanation of these methods are omitted.

As another feature of this invention, a defective winding can be determined on the basis of the foregoing parallel admittance currents at the occurrence of an internal defect. The following describes this capability for the case of a three-winding transformer.

For example, in FIG. 12 shown as an example of the arrangement of the fault judgement elements, when attention is paid on the fault judgement elements 101, 102, 106 and 107, the operations of these judgement elements at an internal defect are as follows. First, in the case of a defective primary winding, the judgement formula (18) is satisfied and the judgement element 101 produces "1", whereas the judgement formulas (19), (23) and (24) are not satisfied and the outputs of the judgement elements 102, 106 and 107 stay "0" unchanged. In the case of a defective secondary winding, the judgement formula (19) is satisfied and the judgement element 102 produces "1", whereas the judgement formulas (18), (23) and (24) are not satisfied and the outputs of the judgement elements 101, 106 and 107 stay "0" unchanged. In the case of a defective tertiary winding, the judgement formula (23) or (24) is satisfied and the judgement element 106 or 107 produces "1", whereas the judgement formulas (18) and (19) are not satisfied and the outputs of the judgement elements 101 and 102 stay "0" unchanged. Accordingly, by knowing the results of judgement of all judgement elements, a defective winding can be determined. Specifically, when the breaker opening command is issued in response to the judgement of a fault, the judgement result of each judgement element is memorized in the memory section of the computer shown in FIG. 1, or it is delivered to the output section 8, or it is displayed on the coefficient setting section 9. The ability of determining a defective winding on the basis of the memorized output of each judgement element after the transformer in trouble internally has been disconnected from the power system provides a significant effectiveness for the determination of the cause of fault and also for the prompt recovery. If it is designed to memorize judgement results for several samples during a certain period before the breaker opening command is issued, in addition to the judgement result at the time of command issuance, more detailed affair of the trouble can be known. By memorizing the values of computation result, besides the judgement result of each judgement element, it becomes possible to infer the seriousness of the internal defect, and it is more effective for the fault recovery. By providing the computer with a program which infers the location of fault and even the seriousness of fault on the basis of the judgement result of each judgement element and the values of computation result, and memorizes, delivers, or displays the program outcomings, a more prompt response to the occurrence of a fault is made possible.

We claim:

1. A method of protecting a transformer connected to an electric power system comprising the steps of measuring terminal currents and terminal voltages of the transformer, detecting variation of parallel admittance currents indicative of an apparent excitation state of the transformer as determined by the measured terminal currents and terminal voltages of the transformer, judging that the transformer is in a state of an internal defect in accordance with the detected variation of parallel admittance currents, and generating a breaker opening command for disconnecting the transformer from the electric power system when judging that the transformer is in a state of internal defect.

2. A method according to claim 1, further comprising the steps of detecting a differential current from the measured terminal currents of the transformer, and judging that the transformer is in a state of internal defect or excitation inrush in accordance with a magnitude of the detected differential current.

3. A method according to claim 1, further comprising the step of evaluating admittance parameters which relate to the terminal currents and terminal voltages of the transformer, and the step of determining that the transformer is in a state of internal defect is made in accordance with one of the detected variation of parallel admittance currents and a magnitude of the admittance parameters.

4. A method according to claim 3, further comprising the steps of detecting a differential current form the measured terminal currents of the transformer, and judging that the transformer is in a state of internal defect or excitation inrush in accordance with a magnitude of the detected differential current.

5. A method of detecting a defective winding of a transformer comprising the steps of measuring excitation currents flowing in windings of the transformer, calculating parallel admittance currents which are equivalent to the measured excitation currents flowing in the transformer windings, and judging a defective winding of the transformer in accordance with a calculated magnitude of the parallel admittance currents.

6. A method according to claim 5, further comprising the steps of measuring the terminal voltage and the terminal current of each winding, and calculating the parallel admittance currents in accordance with the measured terminal voltage and terminal current.

7. A method according to claim 5, further comprising the step of calculating parallel admittances, and the step of determining a defective winding includes effecting the determination in accordance with the magnitudes of the parallel admittance currents and the parallel admittances.

8. A method according to claim 7, wherein the step of calculating the parallel admittance is carried out for a winding located nearest to the transformer core, and for other windings of the transformer, the parallel admittance currents are used for determination of a defective winding.

9. A method according to claim 7, wherein the step of calculating parallel admittances includes utilizing the terminal voltage of each winding and the terminal current of each winding.

10. A method according to claim 9, wherein the step of calculating the parallel admittance is carried out for a winding located nearest to the transformer core, and for other windings of the transformer, the parallel admittance currents are used for determination of a defective winding.

* * * * *